United States Patent [19]

Nakahara et al.

[11] Patent Number: 4,917,872
[45] Date of Patent: Apr. 17, 1990

[54] METHOD FOR PRODUCING TITANIUM FLUORIDE

[75] Inventors: Keisuke Nakahara; Hideyuki Yoshikoshi; Toshio Hinami; Takaho Kawawa, all of Tokyo, Japan

[73] Assignee: NKK Corporation, Tokyo, Japan

[21] Appl. No.: 276,311

[22] Filed: Nov. 25, 1988

[30] Foreign Application Priority Data

Dec. 4, 1987 [JP] Japan .................................. 62-306921

[51] Int. Cl.$^4$ ........................ C01G 23/02; C01G 49/10
[52] U.S. Cl. .......................................... 423/76; 423/81; 423/83; 423/85; 423/140; 423/143; 423/464; 423/489
[58] Field of Search ................. 423/464, 483, 489, 81, 423/76, 82, 83, 85, 140, 143

[56] References Cited

U.S. PATENT DOCUMENTS 2,042,434  5/1936  Svendsons .............................. 423/76
2,568,341  9/1951  Kawecki et al. ....................... 423/81

FOREIGN PATENT DOCUMENTS 451621  12/1972  U.S.S.R. ............................... 423/489
1235512  6/1971  United Kingdom ................. 423/483

Primary Examiner—Jeffrey E. Russel
Assistant Examiner—Brian M. Bolam
Attorney, Agent, or Firm—Frishauf Holtz Goodman & Woodward

[57] ABSTRACT

A method for producing titanium fluoride comprises: a dissolution process, wherein iron-containing titanium material is dissolved in solutions containing hydrofluoric acid, fluoride solutions being produced; a first crystallization and separation process, wherein ferric fluoride is crystallized and ferric fluoride crystals thus obtained are separated from the fluoride solutions by cooling the fluoride solutions, crude titanium fluoride solutions being produced; a second crystallization and separation process, wherein a mixed salt of $(NH_4)_2 TiF_6$ and $(NH_4)_3 FeF_6$ is crystallized and separated by mixing ammonium fluoride solutions with the crude titanium fluoride solutions to obtain a mixture and concentrating the mixture; a first pyrolysis process, wherein the ammonium fluoride salt is pyrolyzed at a temperature of from 300° to 800° C. in a stream of dry gas after having dried the ammonium fluoride, solid ferric fluoride ($FeF_3$) and gaseous $TF_4$, HF and $NH_3$ being produced; a condensation and separation process, wherein the gaseous $TiF_4$, HF and $NH_3$ are condensed at a temperature of from 20° to 280° C. and followed by the $TiF_4$ separation of solid.

18 Claims, 3 Drawing Sheets

METHOD FOR PRODUCING TITANIUM FLUORIDE

BACKGROUND OF THE INVENTION

1. Field of the Invention

The present invention relates to a method for producing titanium fluoride of high purity by using iron-containing titanium ore as material.

2. Description of the Prior Arts

Various Methods for producing titanium fluoride ($TiF_4$) from iron-containing titanium materials such as ilmenite ore (hereinafter referred to as "ilmenite") are reported. The following method, for example, is disclosed in a British Patent Application No. 29944/72.

(1) Ilmenite is oxidized until all iron content in the ilmenite becomes trivalent. The oxidized ilmenite and ferric fluoride are mixed to obtain a mixture. The ilmenite reacts with ferric fluoride in the mixture by heating, titanium fluoride ($TiF_4$) vapor and ferric oxide ($Fe_2O_3$) being produced;

(2) Titanium fluoride ($TiF_4$) is recovered upon condensing titanium fluoride ($TiF_4$) vapor;

(3) A part of ferric oxide ($Fe_2O_3$) reacts with acid ammonium fluoride ($NH_4HF_2$), ferric ammonium fluoride [$(NH_4)_3FeF_6$] being produced; and (4) Ferric ammonium fluoride (($NH_4)_3FeF_6$) is pyrolyzed to ferric fluoride ($FeF_3$) and $NH_4F$, the ferric fluoride ($FeF_3$) and $NH_4F$ being recycled.

A solvent extraction method disclosed in a journal "Chemistry and Industry", 57 (10), pp. 387 to 392, (1983) is another method for producing metallic titanium by obtaining titanium fluoride from ilmenite. The method is described in the journal as follows:

(1) Ilmenite is dissolved in acid, aqueous solutions containing Ti-ion being produced. Ti-ion is extracted in an organic solvent out of the aqueous solutions;

(2) Ti-ion is extracted by having solutions containing $NH_4HF_2$ come in contact with an organic solvent in which Ti-ion has been extracted, titanium ammonium fluoride (($NH_4)_2TiF_6$) being obtained; and (3) Crystals of titanium ammonium fluoride (($NH_4)_2TiF_6$) are pyrolyzed in an inert gas atmosphere, titanium fluoride ($TiF_4$) vapor being produced. The vapor is condensed, titanium fluoride being obtained.

The method disclosed in British Patent Application No. 29944/72 has the following shortcomings.

(1) The yield of titanium fluoride is as low as approximately 91% because titanium fluoride is produced by a solid phase reaction or a gas-solid reaction of ilmenite ore with ferric fluoride.

(2) It is said in the British Patent Application No. 29944/72 that a fluorination reaction of ilmenite ore of 150 to 250 μm in particle size with ferric fluoride of 1 μm or less in particle size in a fluidized-bed furnace is desired. The reaction efficiency of ferric fluoride is decreased by an entrainment of ferric fluoride and a mixing of ferric fluoride with recovered titanium fluoride cannot be avoided because difference of the particle size between ilmenite ore powder and ferric fluoride powder grows larger. Consequently, some countermeasures are required. To overcome said difficulties, some technical solution of problems is needed.

(3) Oxidation of ilmenite ore is required as a pretreatment. This requires grinding of ferric fluoride and a fluidized-bed furnace capable of withstanding a temperature of from 500° to 1500° is necessary for fluorination of ferric fluoride. Therefore, there are problems in high production cost and cost of equipment and in economical efficiency.

Further, there are problems in the solvent extraction method that technologies of dissolution of ilmenite ore in acid and of a treatment of iron ore residual solutions containing iron after the extraction of the solvent are unknown and, moreover, the running cost of the organic solvent is high.

SUMMARY OF THE INVENTION

It is an object of the present invention to provide a method for producing titanium fluoride wherein titanium fluoride is produced with high yield and, in addition, economically more effectively than prior art methods.

To accomplish said object, the present invention provides a method for producing titanium fluoride, comprising:

a dissolution process, wherein iron-containing titanium material is dissolved in solutions containing hydrofluoric acid, fluoride solutions being produced;

a first crystallization and separation process, wherein ferric fluoride is crystallized and the ferric fluoride crystals thus obtained are separted from the fluoride solutions by cooling the fluoride solutions, crude titanium fluoride solutions being produced;

a second crystalization and separation process, wherein ammonium fluoride salt (mixed salt of $(NH_4)_2TiF_6$ and $(NH_4)_3FeF_6$) is crystallized and separated by mixing ammonium fluoride solutions with the crude titanium solutions and concentrating said mixture;

a first pyrolysis process, wherein said ammonium fluoride salt is pyrolyzed at a temperature of from 300° to 800° C. in a stream of dry gas after having dried said ammonium fluoride, ferric fluoride ($FeF_3$) in a solid state and $TiF_4$, HF and $NH_3$ in a gaseous state being produced; and a condensation and separation process, wherein said $TiF_4$, HF and $NH_3$ in a gaseous state are condensed at a temperature of from 20° to 280° C. and the $TiF_4$ in a solid state is separated from HF and $NH_3$ in a gaseous state.

DESCRIPTION OF THE PREFERRED EMBODIMENT

Figure 1:
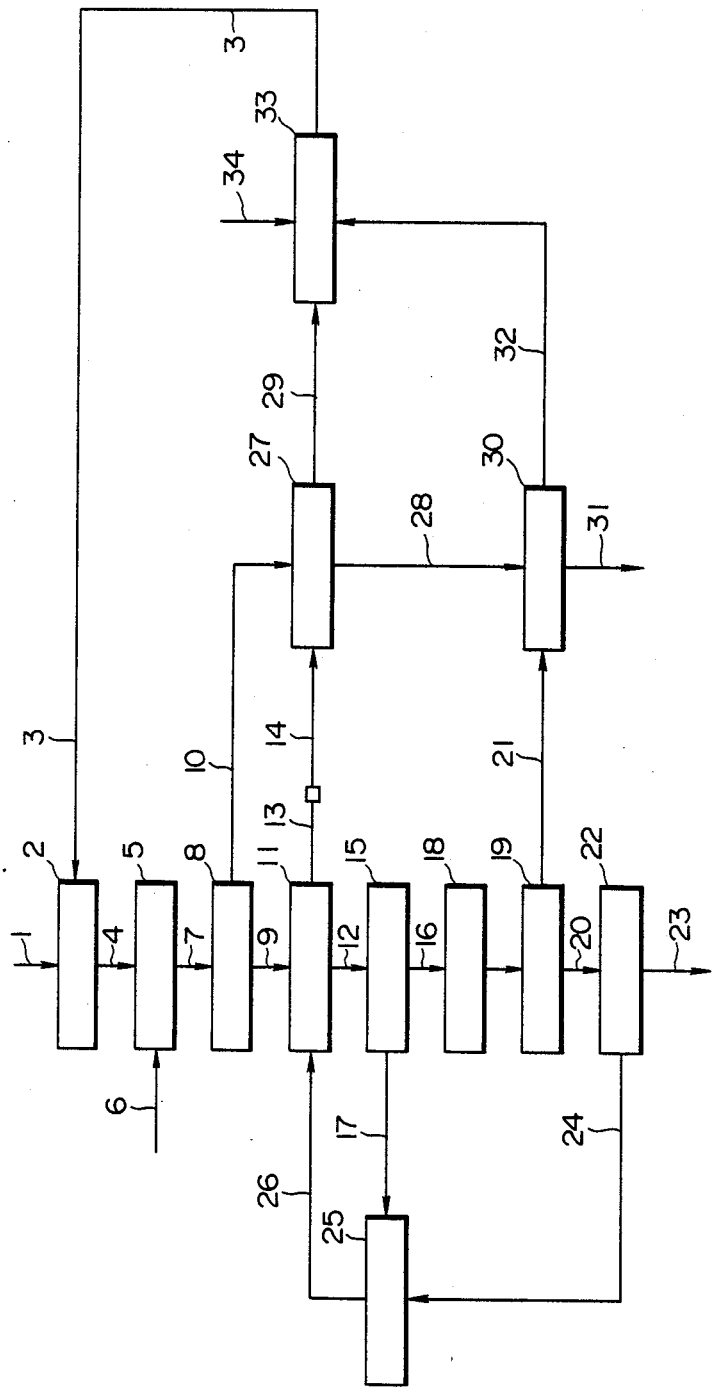
FIG. 1 is a flow diagram designating a method for producing titanium fluoride of the present invention.

The flow of a production process of the present invention will now be explained with specific reference to FIG. 1.

(1) Fluorination dissolution

Figure 2:
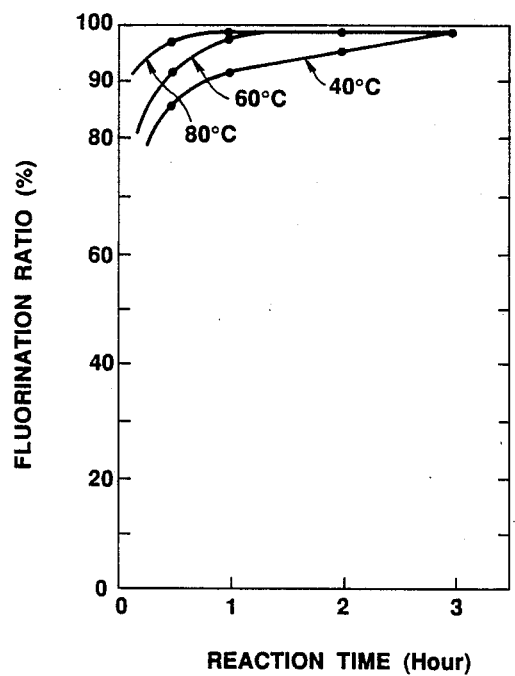
FIG. 2 is a graphical representation designating the influence of reaction time and reaction temperature on the fluorination ratio.

Hydrofluoric acid (HF sol.) of the reaction equivalent ratio of 1.1 or more is added to iron-containing titanium material 1 such as ilmenite ore (hereinafter referred to as "ilmenite") and subjected to fluorination dissolution process 2 at a temperature of 40° C. or more. FIG. 2, shows the influence of reaction time and reaction temperature on the fluorination ratio in the case where the amount of hydrofluoric acid exceed the reaction equivalent by 1.2 times. As clearly seen from FIG. 2, the higher the reaction temperature in the fluorination dissolution, the more the time required for the completion of the fluorination is shortened, the fluorination dissolution finished almost within an hour with the range of from 60° to 80° C. During the fluorination dissolution, it is unnecessary to grind ilmenite, but ilmenite can be ground to shorten the time for dissolution thereof.

(2) Crystallization and separation of ferric fluoride crystals

Figure 3:
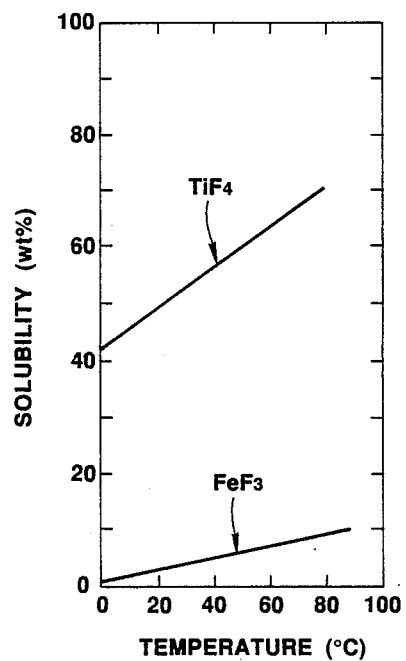
FIG. 3 is a graphical representation designating the influence of temperature on solubility of $TiF_4$ and $FeF_3$.

Subsequently, fluoride solutions 4 are cooled to the dissolution temperature of erric fluoride or less. Ferric fluoride is crystallized and the ferric fluoride crystals 10 ($FeF_3.4.5H_2O$) thus obtained are separated from fluoride solutions 4 as process 8. Thus, crude titanium fluoride solutions 9 (crude $TiF_4$ solutions) are produced. FIG. 3 is a graphical representation designating the influence of temperatures on solubility of $TiF_4$ and $FeF_3$. As clearly seen from FIG. 3, the lower the dissolution temperature is, the lower the solubility of $FeF_3$ is. The lower a cooling temperature during the crystallization is, the more the amount of the crystallization of ferric fluoride crystls ($FeF_3.4.5H_2O$) 10 is. This can lighten the burden in the processes to follow. A cooling temperature in the range of from 0° to 20° C. is desirable. When the cooling temperature is higher than 20° C., the separation efficiency of ferric fluoride crystals 10 is lower. When the cooling temperature is lower than 0° C. the cooling efficiency is lower. In case $Fe^{2+}$ and $Fe^{3+}$ are contained in ilmenite, $Fe^{2+}$ and $Fe^{3+}$ also are included in fluoride solutions 4, $FeF_2$ and $FeF_3$ being produced. $FeF_2$ and $TiF_4$ produce double salt during the cooling of fluoride solutions 4. $TiFeF_6.6H_2O$ together with ferric fluoride crystals 10 ($FeF_3.4.5H_2O$) is precipitated and prevents $TiF_4$ from being converted to solutions. Therefore, it is effective to prevent $TiFeF_6.6H_2O$ from being produced by making an oxidation 5 of $Fe^{2+}$ into $Fe^{3+}$ before the cooling and the crystallization of ferric fluoride crystals 10 ($FeF_3.4.5H_2O$). Oxidization 5 of $Fe^{2+}$ into $Fe^{3+}$ is carried out by adding oxidizing agents 6 such as hydrogen peroxide solutions, ozone, air and oxygen to fluoride solutions 4 or by having said oxidizing agents come in contact with fluoride solutions 4. Iron content in fluoride soluitons 7 can be reduced to a half to one tenth by making oxidation 5 of $Fe^{2+}$ into $Fe^{3+}$ and by making crystallization and separation 8 of ferric fluoride crystals.

(3) Crystallization and separation of ammonium fluoride salt

Figure 4:
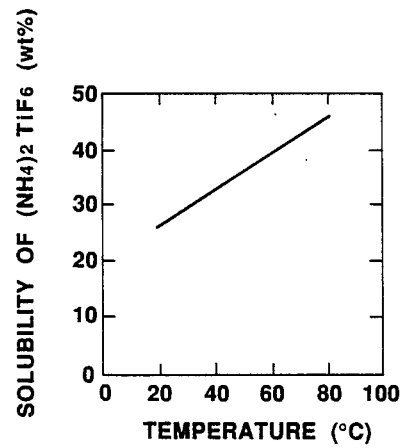
FIG. 4 is a graphical representation designating the influence of temperature on solubility of titanium ammonium fluoride.

Subsequently, titanium ammonium fluoride (($NH_4)_2TiF_6$) and ferric ammonium fluoride (($NH_4)_3FeF_6$) are crystallized by mixing crude titanium fluoride solutions (crude $TiF_4$ solutions) obtained by making crystallization and separation 8 of ferric fluoride crystals ($FeF_3.4.5H_2O$) 10 with ammonium fluoride solutions ($NH_4F$) 26 which is produced in the following processes. In this crystallization process, water in the mixed solutions is desired to be recovered by making evaporation and condensation 11 of the mixed solutions so as to control the water balance in the solutions. Ammonium fuoride salt crystallized by evaporation and concentration 11 of the mixed solutions turns into coarse grains, and crystallization and separation process 15 is easily carried out. As shown in FIG. 4, the crystallization and separation of ammonium fluoride salt from concentrated solutions 12 can be further effectively carried out by cooling concentrated solutions 12. Crystallization and separation 15 of concentrated solutions 12 of ammonium fluoride salt obtained in this way is carried out and concentrated solutions 12 of ammonium fluoride salt are converted to ammonium fluoride salt 16 and ammonium fluoride solutions 17 containing a part of disssolved ammonium fluoride salt. Ammonium fluoride solutions 17 absorb gases 24 of ammonia ($NH_3$) and hydrogen fluoride (HF) produced in a condensation and separation process which will be explained later and are mixed again, as ammonium fluoride solutions 26 ($NH_4F$ solutions), with crude titanium fluoride solutions (crude $TiF_4$ solutions) 9. Water vapor 13 which is obtained in evaporation and condensation process 11 is condensed and turns into condensed water. A part of the water obtained by condensation of water vapor 13 is discharged. Remaining water 14 obtained by condensation of water vapor 13 is used for washing ferric fluoride crystals 10 ($FeF_3.4.5H_2O$) obtained in said crystallization and separation 8, $TiF_4$ and HF adhering to ferric fluoride crystals 10 ($FeF_3.4.5H_2O$) being absorbed in the remaining water 14. Further, HF gas 32 produced in the further successive processes and material HF gas 34 are absorbed in the remaining water 14, hydrofluoric acid 3 being produced. Hydrofluoric acid 3 is used for the fluorination dissolution 2 process. Washing water is desired to be cold water to prevent the ferric fluoride crystals from dissolving during cleaning 27. It is very effective in preventing fluorine from being discharged out of the same circuit and, at the same time, in reducing the cost for a measure of reducing pollution and the cost for hydrogen fluoride as material to recycle water and hydrogen fluoride (HF) in the same circuit in this way.

(4) Drying and pyrolyzing of ammonium fluoride salt

Ammonium fluoride salt 16 being a mixed salt of titanium ammonium fluoride (($NH_4)_2TiF_6$) and ferric ammonium fluoride (($NH_4)_3FeF_6$) is subjected to drying process 18 and heated at a temperature of from 300° to 800° C. in a stream of dry gas not containing water. Ammonium fluoride salt 16 is pyrolzed by heating, as pyrolyzing process 19, $FeF_3$ in a solid state 21 and $TiF_4$, HF and $NH_3$ in a gaseous state 20 are produced. The pyrolyzing process proceeds with the following reaction:

$$(NH_4)_2 TiF_6 \rightarrow TiF_4 + 2HF + 2 NH_3$$

It is important that the dry gas does not contain water. Dry nitrogen, dry air, dry argon or the like can be used as the dry gas. When the gas contains water, $TiF_4$ gives rise to a hydrolysis reaction at high temperature, produces titanium oxide and this leads to a decrease of the yield of $TiF_4$. Heating temperature is in the range of from 300° to 800° C. The hydrolysis reaction proceeds as follows:

$$TiF_4 + 2H_2O \rightarrow TiO_2 + 4HF$$

When the heating temperature is lower than 300° C., $TiF_4$ does not sublime perfectly. When the heating temperature is higher than 800° C., $FeF_3$ sublimes a a little. The heating temperature is preferred to be in the range of from 400° to 600° C.

(5) Condensation of titanium fluoride

Titanium fluoride ($TiF_4$) 23 of high purity is obtained by subjecting gases 20 of $TiF_4$, HF and $NH_3$ to condensation and separation process 22 at a temperature of from 20° to 280° C. in a condenser. The condensation temperature is in the range of from 20° to 280° C. When the temperature is over 280° C., $TiF_4$ sublimes completely. When the temperature is lower than 20° C., HF liquefies. The condensation temperature is preferred to be in the range of from 50° to 100° C. Gases 24 containing HF and $NH_3$ after having condensed and separated titanium fluoride ($TiF_4$) 23 are absorbed 25 by ammonium fluoride solutions 17 which are recycled as ammonium fluoride solutions 26.

(6) Pyrolysis 30 of $FeF_3$

Solid 21 of $FeF_3$ as a residue obtained by pyrolysis 19 of ammonium fluoride salt is mixed with crystals of ferric fluoride ($FeF_3.4.5H_2O$) 28 obtained by making crystallization and separation 8 of fluorination solutions 7 and heated at a temperature of from 600° to 1000° C. with existing water. Then, $FeF_3$ is hydrolyzed, and iron oxide ($Fe_2O_3$) 31 and hydrogen fluoride (HF) 32 are produced. When the heating temperature is lower than 600° C., the hydrolysis reaction does not take place. When the heating temperature is over 1000° C., $FeF_3$ sublimes. Iron oxide ($Fe_2O_3$) 31 is discharged as by-products. Hydrogen fluoride (HF) is absorbed 33 by cleaning solutions 29 of crystals of ferric fluoride ($FeF_3.4.5H_2O$) as mentioned above and is used again for fluorination dissolution 2 of ilmenite.

As mentioned above, according to the present invention, ilmenite ore can be almost perfectly dissolved by reacting it with solutions containing hydrofluoric acid at a temperature of 40° C. or more, and almost all the amount of titanium content in the ilmenite ore can be extracted as titanium fluoride. Therefore, the reaction production ratio of titanium fluoride is remarkably high and the yield of titanium fluoride is 95% or more. Further, according to the present invention, there is no need to use expensive organic solvents such as those used in a solvent extraction method for separating iron content from the fluorination solutions of iron-containing material. Titanium fluoride can be refined and separated at a cost lower than that in the solvent extraction method with the use of a combination of a rough separation of titanium fluoride from iron fluoride, wherein differences in solubility of titanium fluoride and iron fluoride are used, with a method of refining and separating them wherein differences in their sublmation temperature are used.

Crystals of iron fluoride obtained by the crystallization and separation process and iron fluoride produced by pyrolysis are hydrolyzed, and fluorine can be recovered as hydrogen fluoride. Ammonia and hydrogen fluoride produced by pyrolysis of ammonium fluoride salt are also recovered and fluorine, a part of which is consumed by reaction, is recycled in the same circuit. Therefore, the method of the present invention is very effective in the reduction of cost as well as in the prevention of pollution.

EXAMPLE-1

A mixture of 10 kg of ilmenite ore (54.9% $TiO_2$, 19.5% FeO and 21.6% $Fe_2O_3$) from West Australia and 17.9 kg of a 55% hydrogen fluoride solution was agitated in a closed Teflon lining reactor at 80° C. for an hour and a fluoride solution was obtained. The fluoride solution was cooled to 30° C. 1.3 kg of 35% wt. $H_2O_2$ solution was added to said fluoride solution. Then, after the fluoride solution had been agitated for a hour, said solution was cooled to 10° C. In this way, 13.6 kg of a cake of $FeF_3.4.5H_2$ and 15.6 kg of crude $TiF_4$ solution was obtained by crystallizing and separating. 11.4 kg of crystals of $FeF_3.4.5H_2O$ and 6.5 kg of washing solutions were obtained by washing the cake of $FeF_3.4.5H_2O$ with 4.3 kg of cold water at 5° C. In Table 1, there are indicated the composition of the crude $TiF_4$ solution, the washing solution and $FeF_3.4.5H_2O$, Ti content and the ratio of migration of Ti in ore.

TABLE 1

| | Weight (kg) | $TiF_4$ (%) | $FeF_3$ (%) | HF (%) | Ti content (%) and amount (kg) | | Ratio of migration of Ti in ore (%) |
|---|---|---|---|---|---|---|---|
| Crude $TiF_4$ solution | 15.6 | 44.1 | 3.0 | 5.7 | 17.0 | 2.65 | 80.5 |
| | | | | | | | 99.0 |
| Washing solutions | 6.5 | 24.1 | 2.8 | 3.2 | 9.4 | 0.61 | 18.5 |
| $FeF_3 \cdot 4.5 H_2O$ | 11.4 | 0.70 | 49.4 | 0.1 | 0.27 | 0.03 | 1.0 |

As shown in Table 1, 99.0 wt.% of Ti contained in ilmenite ore migrated to the crude $TiF_4$ solution and the washing solution. Subsequently, 16.6 kg of ammonium fluoride solution (37.6 wt.% of $NH_4F$ and 18.8 wt.% of Ti ($NH_4(F_6)$ containing dissolved $Ti(NH_4)_2F_6$ at 20° C. was mixed with a mixture of the crude $TiF_4$ solution and the washing solution. The mixture thus obtained was concentrated under reduced pressure, being agitated at 80° C. After 11.9 kg of water had been evaporated from the mixture, the mixture was cooled to 20° C. Then, 14.8 kg of amonium fluoride salt was obtained by filtering and separating said ammonium fluoride from the mixture and by drying said ammonium fluoride at 105° C. for 5 hours. The composition of said ammonium fluoride salt is indicated in Table 2.

TABLE 2

| Composition | Content (%) |
|---|---|
| $(NH_4)_2TIF_6$ | 90.4 |
| $(NH_4)_3FeF_6$ | 9.6 |

Subsequently, said ammonium fluoride salt was put in a hastelloy pyrolysis reactor and heated to 400° C. in a stream of dry nitrogen gas. Outlet gas containing pyrolysis gas was sent to a condenser, whose temperature was at 80° C. 8.2 kg of $TiF_4$ was recovered in said condenser. 8.2 kg of $TiF_4$ corresponds to 98 wt.% titanium fluoride in 14.8 kg of ammonium fluoride salt. As a result, 96 wt.% of Ti in ilmenite ore was recovered in the form of $TiF_4$. The outlet gas of the condenser was absorbed in filtrate obtained by filtering and separating ammonium fluoride salt from the mixture, and the gas was recycled again in the pyrolysis reactor after dehumdication of the gas. 0.6 kg of $FeF_3$ remaining in the pyrolysis reactor was mixed with 11.4 kg of crystals of $FeF_3.4.5H_2O$ obtained by cooling and crystallization 4.4 kg of $Fe_2O_3$ was obtained as a residue by subjecting said mixture to a heat treatment at 700° C. with the use of air as carrier gas. Outlet gas produced during the heat treatment was sent to the condenser at 5° C. and 7.6 kg of hydrofluoric acid liquid containing 3.3 kg of hydrogen fluoride was obtained.

EXAMPLE-2

Titanium ammonium fluoride was dried at 105° C. for 20 hours. After 100.0 g of dried titanium ammonium fluoride had been charged into a tubular furnace, the inside of said tubular furnace was heated to approximately 500° C. by passing, at a rate of 1 liter per min., the air which had been dried by being passed through a calcium chloride tube. Outlet gas of said tubular furnace was sent to the condenser whose temperature was at 50° C., and 61.5 g of titanium fluoride was recovered. The ratio of recovery was 98%.

For comparison, a test was conducted with the use of air, as a control, which had not been passed through the calcium chloride tube, that is, air in the atmosphere. Firstly, titanium ammonium fluoride was dried at 105° C. for 20 hours. After 100.0 g of dried titanium ammonium fluoride had been charged into a tubular furnace, the inside of said tubular furnace was heated to approximately 500° C. in a stream of atmospheric air. Outlet gas was sent to a condenser whose temperature was at 50° C. In consequence, 48.0 g of titanium fluoride was recovered and 9.8 g of titanium oxide remained in the furnace. The ratio of recovery of titanium fluoride was 77%.

EXAMPLE-3

14.8 kg of ammonium fluoride salt, whose composition is indicated in Table 2 and which was controlled in the same manner as Example-1, was put in the hastelloy pyrolysis reactor and was heated to 400° C. in a stream of the dry air dried by being passed through the calcium chloride tube. Outlet gas containing pyrolized gas was sent to a condenser whose temperature was at 80° C. and 8.2 kg of $TiF_4$ was recovered. When dry air was used as the dry gas, 98% titanium fluoride in 14.8 kg of ammonium fluoride salt could be recovered.

What is claimed is:
1. A method for producing titanium fluoride, comprising the sequential steps of:
   (1) dissolving iron-containing titanium material in a hydrofluoric acid solution to produce a fluoride solution;
   (2) crystallizing ferric fluoride in the fluoride solution followed by separation from the fluoride solution of the ferric fluoride crystals thus obtained by cooling the fluoride solution to produce a crude titanium fluoride solution;
   (3) crystallizing and separating a mixed salt of $(NH_4)_2TiF_6$ and $(NH_4)_3FeF_6$ by mixing an ammonium fluoride solution with the crude titanium fluoride solution followed by concentrating said mixture;
   (4) drying said mixed salt and pyrolyzing said mixed salt at a temperature of from 300° to 800° C. in a stream of dry gas to produce solid ferric fluoride ($FeF_3$) and gaseous mixture of $TF_4$, HF and $NH_3$; and
   (5) condensing the gaseous $TiF_4$, HF and $NH_3$ at a temperature of from 20° to 280° C. to produce solid $TiF_4$ which is separated from gaseous HF and $NH_3$.

2. The method of claim 1, further comprising an oxidation step, wherein divalent iron-ion in the fluoride solution is oxidized into trivalent iron-ion by blowing an oxidizing agent into the fluoride solution obtained in step 1.

3. The method of claim 1, further comprising a second pyrolysis step, wherein the ferric fluoride crystals obtained in step 2 and the ferric fluoride obtained in step 4 are hydrolyzed at a temperature of from 600° to 1000° C. to produce iron oxide ($Fe_2O_3$) and HF.

4. The method of claim 1, wherein the ammonium fluoride solution to be mixed in step 3 include solutions which are produced by absorbing the HF and $NH_3$ gases obtained in step 5 in ammonium fluoride solutions containing a dissolved portion of the ammonium fluoride salt obtained in step 3.

5. The method of claim 1, wherein the dissolution of titanium material in step 1 is at a reaction temperature of from 60° to 90° C.

6. The method of claim 1, wherein the cooling of the fluoride solution in step 2 is at a temperature of from 0° to 20° C.

7. The method of claim 1, wherein step 3 further includes mixing an ammonium fluoride solution with said crude titanium fluoride solution followed by evaporating and concentrating the mixture to crystallize and separate a mixed salt of $(NH_4)_2TiF_6$ and $(NH_4)_3FeF_6$.

8. The method of claim 1, wherein step 3 further includes mixing an ammonium fluoride solution with said crude titanium fluoride solution followed by evaporating and cooling the mixture to crystallize and separate a mixed salt of $(NH_4)_2TiF_6$ and $(NH_4)_3FeF_6$.

9. The method of claim 1, wherein step 4 is conducted at a temperature of from 400° to 600° C. in a stream of dry gas selected from the group consisting of dry nitrogen, dry air and dry argon.

10. The method of claim 1, wherein step 5 is conducted at a temperature of from 50° to 100° C.

11. A method for producing titanium fluoride comprising the sequential steps of:
   (1) dissolving iron-containing titanium material in a hydrofluoric acid solution to produce a fluoride solution;
   (2) crystallizing ferric fluoride in the fluoride solution followed by separating from the fluoride solution the ferric fluoride crystals thus obtained to produce a crude titanium fluoride solution;
   (3) crystallizing a mixed salt of $(NH_4)_2TiF_6$ and $(NH_4)_3FeF_6$ by mixing an ammonium fluoride solution with the crude titanium fluoride solution followed by concentrating said mixture.

12. The method of claim 4, further comprising an oxidation step, wherein divalent iron-ion in the fluoride solution is oxidized into trivalent iron-ion by blowing an oxidizing agent into the fluoride solution obtained in step 1.

13. The method of claim 11, wherein step 3 is followed by pyrolyzing said mixed salt at a temperature of from 300° to 800° C. in a stream of dry gas to produce solid ferric fluoride ($FeF_3$) and gaseous $TiF_4$, HF and $NH_3$ and condensing the gaseous $TiF_4$, HF and $NH_3$ at a temperature of from 20° to 280° C. to produce solid $TiF_4$.

14. The method of claim 11, wherein the dissolving of titanium material in step 1 is at a reaction temperature of from 60° to 90° C.

15. The method of claim 11, wherein the fluoride solution is cooled at a temperature of from 0° to 20° C.

16. The method of claim 11, wherein step 3 further includes mixing an ammonium fluoride solution with said crude titanium fluoride solution followed by evaporating and concentrating the mixture to crystallize and separate a mixed salt of $(NH_4)_2TiF_6$ and $(NH_4)_3FeF_6$.

17. The method of claim 13, wherein pyrolysis is conducted at a temperature of from 400° to 600° C. in a stream of dry gas selected from the group consisting of dry nitrogen, dry air and dry argon.

18. The method of claim 13, wherein condensation is conducted at a temperature of from 50° to 100° C.

* * * * *